United States Patent
Chavez

(10) Patent No.: US 9,183,514 B2
(45) Date of Patent: Nov. 10, 2015

(54) ADVANCED USER INTERFACE AND CONTROL PARADIGM INCLUDING CONTEXTUAL COLLABORATION FOR MULTIPLE SERVICE OPERATOR EXTENDED FUNCTIONALITY OFFERS

(75) Inventor: David L. Chavez, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 49 days.

(21) Appl. No.: 13/172,368

(22) Filed: Jun. 29, 2011

(65) Prior Publication Data

US 2012/0221952 A1    Aug. 30, 2012

Related U.S. Application Data

(60) Provisional application No. 61/446,884, filed on Feb. 25, 2011.

(51) Int. Cl.
| | |
|---|---|
| *G06F 3/00* | (2006.01) |
| *G06Q 10/00* | (2012.01) |
| *H04N 21/4788* | (2011.01) |
| *H04N 21/482* | (2011.01) |

(52) U.S. Cl.
CPC .......... *G06Q 10/00* (2013.01); *H04N 21/4788* (2013.01); *H04N 21/4826* (2013.01)

(58) Field of Classification Search
CPC . G06F 3/0317; G06F 3/03545; G06F 3/0481; G06F 9/06; G06F 17/30303; G06F 19/322; G06F 3/04817; G06F 3/0482; G06F 17/30; G06F 3/04883; G06F 13/00; G06F 2203/04802; G06F 3/017; G06F 3/04815; G03Q 10/00

USPC ............. 715/764, 762, 723; 707/722
See application file for complete search history.

(56) References Cited

U.S. PATENT DOCUMENTS

| | | |
|---|---|---|
| 6,411,307 B1 | 6/2002 | Rosin et al. |
| 7,647,614 B2 | 1/2010 | Krikorian et al. |
| 7,702,952 B2 | 4/2010 | Tarra et al. |
| 7,707,614 B2 | 4/2010 | Krikorian et al. |
| 7,725,912 B2 | 5/2010 | Margulis |
| 7,769,756 B2 | 8/2010 | Krikorian et al. |
| 7,873,988 B1 | 1/2011 | Issa et al. |
| 7,877,776 B2 | 1/2011 | Krikorian et al. |

(Continued)

OTHER PUBLICATIONS

Chavez, David L., U.S. Appl. No. 13/172,363, Entitled "Advanced User Interface and Control Paradigm for Multiple Service Operator Extended Functionality Offers", filed Jun. 29, 2011, 36 pages.

(Continued)

*Primary Examiner* — William Bashore
*Assistant Examiner* — Rayeez Chowdhury
(74) *Attorney, Agent, or Firm* — Sheridan Ross P.C.

(57) ABSTRACT

Methods and systems for presenting information regarding multiple categories of content are provided. In addition, methods and systems that suggest activities by a user in relation to content and determined affinity for content in relation to user contacts are provided. A user interface application is provided that operates to display status and/or historical information regarding content, suggested activities, and suggested contacts. The user can interact with the interface to access detailed information and to act on suggestions. In addition the user can interact with the interface to share content to other users, including users participating in real time communication sessions.

10 Claims, 8 Drawing Sheets

(56) References Cited

U.S. PATENT DOCUMENTS

| | | | |
|---|---|---|---|
| 7,895,633 B2 | 2/2011 | Van Hoff et al. | |
| 7,917,932 B2 | 3/2011 | Krikorian | |
| 7,921,446 B2 | 4/2011 | Krikorian et al. | |
| 8,239,903 B1 | 8/2012 | Campagna et al. | |
| 2002/0016837 A1* | 2/2002 | Naudus | 709/224 |
| 2002/0143912 A1* | 10/2002 | Michels et al. | 709/223 |
| 2005/0044361 A1* | 2/2005 | Chang et al. | 713/167 |
| 2005/0071481 A1* | 3/2005 | Danieli | 709/229 |
| 2005/0091316 A1 | 4/2005 | Ponce et al. | |
| 2005/0091694 A1 | 4/2005 | Rambo | |
| 2005/0235361 A1 | 10/2005 | Alkove et al. | |
| 2006/0095792 A1 | 5/2006 | Hurtado et al. | |
| 2007/0003223 A1* | 1/2007 | Armstrong et al. | 386/95 |
| 2007/0016654 A1 | 1/2007 | Bowles et al. | |
| 2007/0199025 A1 | 8/2007 | Angiolillo et al. | |
| 2007/0204064 A1 | 8/2007 | Mail et al. | |
| 2008/0066126 A1* | 3/2008 | Walter et al. | 725/97 |
| 2008/0250332 A1* | 10/2008 | Farrell et al. | 715/753 |
| 2009/0019488 A1 | 1/2009 | Ruiz-Velasco et al. | |
| 2009/0164624 A1* | 6/2009 | Metcalf et al. | 709/224 |
| 2009/0175193 A1* | 7/2009 | Shaffer et al. | 370/254 |
| 2009/0193015 A1* | 7/2009 | Jang et al. | 707/5 |
| 2009/0222870 A1 | 9/2009 | Gruber et al. | |
| 2009/0228294 A1* | 9/2009 | Choi et al. | 705/1 |
| 2009/0241153 A1 | 9/2009 | Campagna et al. | |
| 2009/0241158 A1 | 9/2009 | Campagna et al. | |
| 2009/0241159 A1 | 9/2009 | Campagna et al. | |
| 2009/0241160 A1 | 9/2009 | Campagna et al. | |
| 2009/0300668 A1 | 12/2009 | Campagna et al. | |
| 2009/0300694 A1 | 12/2009 | Campagna et al. | |
| 2009/0313304 A1* | 12/2009 | Goodger et al. | 707/104.1 |
| 2009/0313553 A1* | 12/2009 | Thornton et al. | 715/751 |
| 2009/0327244 A1 | 12/2009 | Rizal | |
| 2010/0246571 A1 | 9/2010 | Geppert et al. | |
| 2010/0246800 A1 | 9/2010 | Geppert et al. | |
| 2010/0251119 A1 | 9/2010 | Geppert et al. | |
| 2010/0251124 A1 | 9/2010 | Geppert et al. | |
| 2010/0251127 A1 | 9/2010 | Geppert et al. | |
| 2010/0251142 A1 | 9/2010 | Geppert et al. | |
| 2010/0251158 A1 | 9/2010 | Geppert et al. | |
| 2010/0251177 A1* | 9/2010 | Geppert et al. | 715/821 |
| 2010/0268694 A1* | 10/2010 | Denoue et al. | 707/693 |
| 2010/0299758 A1 | 11/2010 | Hyun et al. | |
| 2011/0029610 A1 | 2/2011 | Chao et al. | |
| 2011/0030021 A1 | 2/2011 | Campagna et al. | |
| 2011/0047501 A1 | 2/2011 | Mohler | |
| 2011/0154266 A1 | 6/2011 | Friend et al. | |
| 2011/0179180 A1* | 7/2011 | Schleifer et al. | 709/227 |
| 2011/0231887 A1 | 9/2011 | West et al. | |
| 2011/0295719 A1 | 12/2011 | Chen et al. | |
| 2012/0179759 A1 | 7/2012 | Li et al. | |
| 2012/0222069 A1 | 8/2012 | Chavez | |
| 2012/0222135 A1 | 8/2012 | Chavez | |
| 2012/0233120 A1 | 9/2012 | Nijim et al. | |
| 2013/0167168 A1 | 6/2013 | Ellis et al. | |

OTHER PUBLICATIONS

Chavez, David L., U.S. Appl. No. 13/172,375, Entitled "Advanced User Interface and Control Paradigm Including Digital Rights Management Features for Multiple Service Operator Extended Functionality Offers", filed Jun. 29, 2011, 47 pages.

"OpenCable Application Platform Specifications: OCAP 1.1 Profile," Cable Television Laboratories, Inc., 2009, 666 pages.

Official Action for U.S. Appl. No. 13/172,363 mailed Mar. 14, 2013, 10 pages.

Official Action for U.S. Appl. No. 13/172,363 mailed Sep. 5, 2013, 10 pages.

Notice of Allowance for U.S. Appl. No. 13/172,363 mailed Mar. 17, 2014, 8 pages.

Official Action for U.S. Appl. No. 13/172,375 mailed Nov. 8, 2013, 24 pages.

Official Action for U.S. Appl. No. 13/172,375 mailed May 22, 2014, 28 pages.

U.S. Appl. 12/134,738, filed Jun. 6, 6008, Chavez et al.

Notice of Allowance for U.S. Appl. No. 13/172,375 mailed Jan. 14, 2015, 15 pages.

* cited by examiner

ADVANCED USER INTERFACE AND CONTROL PARADIGM INCLUDING CONTEXTUAL COLLABORATION FOR MULTIPLE SERVICE OPERATOR EXTENDED FUNCTIONALITY OFFERS

CROSS-REFERENCE TO RELATED APPLICATIONS

This patent application claims the benefit of U.S. Provisional Patent Application Ser. No. 61/446,884, filed Feb. 25, 2011, and is related to U.S. patent application Ser. No. 13/172,363, filed Jun. 29, 2011, entitled "ADVANCED USER INTERFACE AND CONTROL PARADIGM FOR MULTIPLE SERVICE OPERATOR EXTENDED FUNCTIONALITY OFFERS", and to U.S. patent application Ser. No. 13/172,375, filed Jun. 29, 2011, entitled "ADVANCED USER INTERFACE AND CONTROL PARADIGM INCLUDING DIGITAL RIGHTS MANAGEMENT FEATURES FOR MULTIPLE SERVICE OPERATOR EXTENDED FUNCTIONALITY OFFERS", the entire disclosures of which are hereby incorporated herein by reference in their entirety.

FIELD

The invention relates generally to the presentation of information related to content available through a common data pipeline. Additional aspects of the invention relate to the interoperability of a user interface application and user profiles.

BACKGROUND

Multiple Service Operators (MSOs), e.g., cable companies, are working to transform their value proposition from one dominated by basic subscriptions and equipment leases to a customer service driven value model. One of the reasons for this is the recent ruling by the Federal Communications Commission (FCC), which has been upheld in court, that MSOs adopt the Open Cable Application Platform (OCAP) and that Set-Top Boxes (STBs) be open to other uses. With larger pipes, more powerful STBs, and improved customer service applications residing in those STBs, the MSO can begin to dominate the other Local inter-Exchange Carriers (LECs). This enhanced customer service value equation is viewed to be one key to continued MSO growth, increased revenue and increased margins. OCAP is a new paradigm that will allow MSOs to create, or have made, and deploy, a whole suite of new interactive communications services that can drive new revenue streams with higher margins for the MSOs. The OCAP middleware, written in the Java® language, will facilitate "write once, use anywhere" application software to provide new features and services created by third party developers.

The OpenCable™ Platform specification can be found at http://www.opencable.com/ocap/, "OpenCable Application Platform Specification (OCAP) 1.1," which is incorporated herein by reference in its entirety.

OCAP is an operating system layer designed for consumer electronics, such as STBs, that connect to a cable television system. Generally, the cable company controls what OCAP programs can be run on the STB. OCAP programs can be used for interactive services such as eCommerce, online banking, program guides and digital video recording. Cable companies have required OCAP as part of the CableCard 2.0 specification, and they indicate that two way communications by third party devices on their networks will require them to support OCAP.

More specifically, OCAP is a Java® language-based software/middleware portion of the OpenCable initiative. OCAP is based on the Globally Executable MHP (GEM)-standard, as defined by CableLabs. Because OCAP is based on GEM, OCAP shares many similarities with the Multimedia Home Platform (MHP) standard defined by the Digital Video Broadcasting (DVB)-project. The MHP was developed by the DVB Project as the world's first open standard for interactive television. It is a Java® language-based environment which defines a generic interface between interactive digital applications and the terminals on which those applications execute. MHP was designed to run on DVB platforms but there was a demand to extend the interoperability it offers to other digital television platforms. This demand gave rise to GEM, or Globally Executable MHP, a framework which allows other organizations to define specifications based on MHP.

One such specification is OCAP which has been adopted by the US cable industry. In OCAP the various DVB technologies and specifications that are not used in the US cable environment are removed and replaced by their functional equivalents, as specified in GEM. On the terrestrial broadcast side, CableLabs and the Advanced Television Systems Committee (ATSC) have worked together to define a common GEM-based specification, Advanced Communications Application Platform (ACAP), which will ensure maximum compatibility between cable and over-the-air broadcast receivers.

Packet Cable 2.0 is a specification based on the wireless Third Generation Partnership Program (3GPP) Internet protocol Multimedia Subsystem (IMS), which uses Session Initiated Protocol (SIP) for session control. By using SIP, MSOs can create the foundation of a service delivery platform on top of their existing DOCSIS (Data Over Cable Service Interface Specification) or cable modem service. Two of the SIP features that are particularly important to this invention are extensibility and interoperability. These SIP features are important because new messages and attributes can be easily defined and communications between previously incompatible endpoints are facilitated.

Another development that sets the stage for the disclosed inventions is the processing power, multimedia codecs and storage capabilities of the STBs. Many of the more advanced STBs have Digital Video Recorders (DVRs) based on hard disk drives or flash memory that provide many gigabytes of available storage. They also have advanced audio/video codecs designed to handle the requirements of High Definition Television (HDTV). Processors such as the Broadcom BCM7118 announced in January 2007, provide over 1000 Dhrystone mega-instructions per second (DMIPS) worth of processing power to support OCAP, new customer applications, and DOCSIS 2.0 and DSG advanced mode. The Broadcom chip, and other general purpose and application-specific integrated circuit (ASIC) processors used for STBs, provide powerful security capabilities such as the emerging Polycipher Downloadable Conditional Access Security (DCAS) system. DCAS eliminates the need for a CableCard and supports multiple conditional access systems and retail products.

SUMMARY

According to embodiments of the present invention, systems and methods that provide a unified view of information related to multiple media types and/or media sessions available from a common pipeline are available. More particularly, a communication node is described that is interconnected to a communication pipeline, such as a multiple service operator (MSO) cable, that provides multiple digital services or bundled services. As examples, these services can include cable television, telephony, digital data (Internet), and the like. A display associated with the communication node presents information to a user regarding the current or historical status of a plurality of the different media types carried by the pipeline in relation to the communication node, and/or content carried by a plurality of the different media types. The display can operate in connection with a unified interface application running on the communication node. In accordance with further embodiments, profile information is used by the unified interface application to provide enhanced information with respect to available content or actions regarding content. For example, an affinity can be determined for certain content or events based on profile information, and the determined affinity can influence the display of information. Moreover, the affinity information can be used in connection with using and integrating social media, blogs, and other social groupings with the extended functionality bundles offered by MSOs.

In accordance with further embodiments, the sharing of content with other users is facilitated. In addition, embodiments provide a view of in-process communications. Sharing of content with other users can be performed through the manipulation of icons or other representations of content, users, and actions presented by the display in connection with the operation of the unified interface application. Accordingly, embodiments of the invention facilitate multimedia, multiparty communications, collaboration and sharing by providing a unified interface application through which such functions and operations can be performed. In addition, embodiments of the disclosed invention can operate to group content and/or users according to various criteria, including criteria resulting from or associated with affinity groupings.

In an exemplary embodiment, the communication node comprises a set-top box (STB) associated with a television display and a remote control, and/or an auxiliary display, for example provided by a tablet computer, although other arrangements and configurations are encompassed by embodiments of the present invention. Information regarding the different media types can be presented as a series of tiles or activity windows presented simultaneously by the display. The displayed information can include listings of available content, such as currently available television programming, programming guides listing television programming available in the future, available television content recorded as part of a digital video recorder (DVR) function of the communication node, listings of programming scheduled to be recorded as part of the DVR function, information regarding in-progress telephony sessions, such as an identification of parties to the telephone conference and an elapsed time of the telephone conference, information regarding past telephony sessions, in progress games, and recordings of gaming sessions. The display can also include tiles that present information regarding Internet sessions conducted in connection with the communication pipeline. Information regarding Internet sessions can include a historical listing of sites that have been visited, an indication of sites currently being accessed, and information characterizing the content of sites. In addition, the presentation of information regarding content can include a representation of that content, for example in the form of a frame or segment of video, a screen scrape taken from an Internet session, or a series of frames or screen scrapes displayed simultaneously.

Displayed information can also include content that is identified based on a determined affinity and/or grouped according to various additional criteria. The content is available for selection, entirely or in part, for further actions by a user interfacing with the display associated with the communication node and the operation of the unified interface application. In addition, other users or contacts with whom the user of the communication node can interact can be displayed. These other users or contacts can be arranged according to groups, such as affinity groups. The sharing of content with selected other users can be performed by dragging and dropping selected content in a spotlight area, and by dragging and dropping one or more contacts or a group of contacts into the spotlight area. In addition, the type of sharing can be determined through a selection made by the user. Different types of sharing can include providing a link, sharing the content itself, providing a notification regarding the content, or other actions. In addition, the content can be shared in part, for example by selecting only some portion or series of frames (e.g., where the content comprises video content).

Profile information can be stored for one or more users or personas. The profile information can be generated automatically, can be taken from user input, or can be the result of a combination of automatic and manual means. The automatic generation of a profile can include monitoring activity surrounding the various media types supported by the system. Input obtained from a user can include selections from menus or other input indicating specific likes and dislikes of the user, permissions, or preferences. Profiles can be specific to individual users of the system, or can be directed to different groups or personas of users. For ease of description, the term "personas" will be used to reference an object of a profile regardless of whether that object is an individual, particular characteristics or alternate profiles of an individual, a group of individuals, or an entity other than an individual. Regardless of the object of a profile or the mechanism by which the profile is generated, the profile information includes information that can be applied by application programming, such as a unified interface application, executed by the communication node or a processor provided by some other node in order to determine an affinity with respect to particular items of content.

The determined affinity or affinity level can be used to present information to a user suggesting programming that the user might like to access in real time or record for later viewing. In addition, affinity information can be used to suggest websites, events, activities that a user may like to access or participate in, or actions that a user may like to take. In accordance with embodiments of the present invention, visibility to such available content, including websites, events, or actions, can be obtained through the Internet access provided by the communication pipeline. Moreover, the affinity information can be combined with presence information concerning other users in order to highlight activities that different users might like to engage in as a group, that different users might like to comment on to one another, or that otherwise suggests common affinities that can be highlighted and presented to a user, to encourage social network activity or other interaction.

Additional features and advantages of embodiments of the present invention will become more readily apparent from the following description, particularly when taken together with the accompanying drawings.

DETAILED DESCRIPTION

Figure 1:
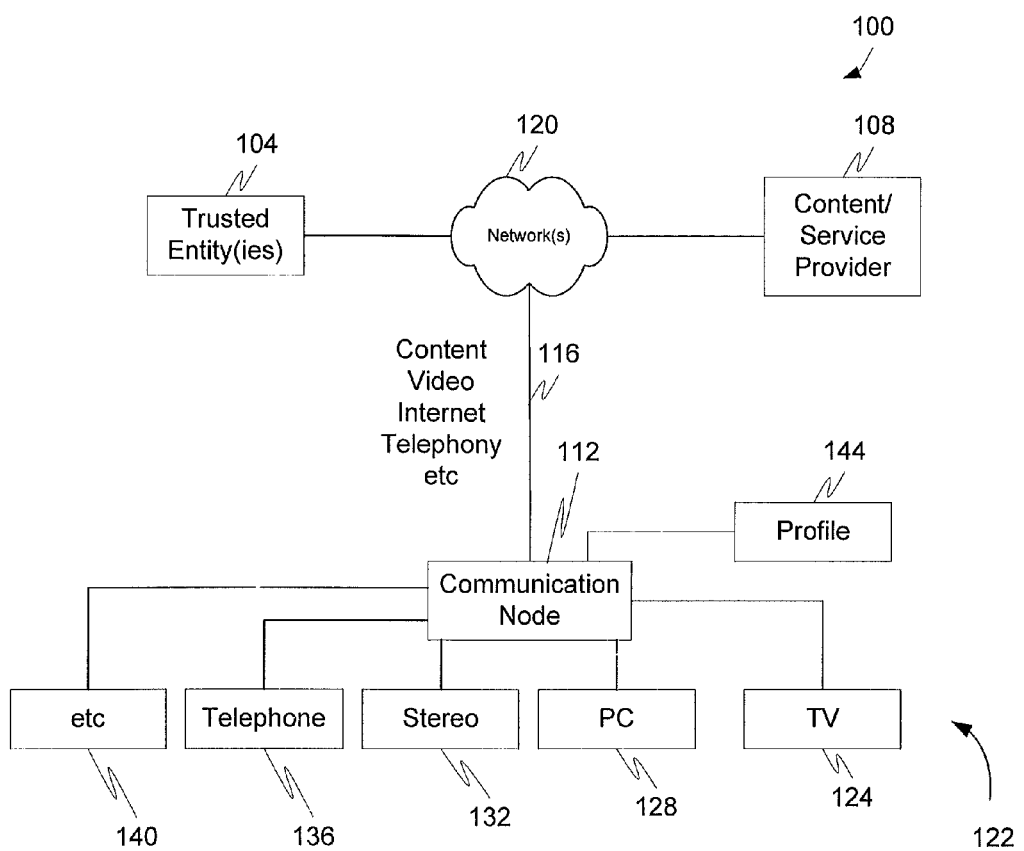
FIG. 1 illustrates an exemplary content system according to embodiments of the invention.

FIG. 1 illustrates an exemplary content system 100. The system 100 comprises one or more trusted entities 104, one or more content/service providers 108, and a communication node 112 such as a set-top box, all interconnected by a data pipeline or link 116 and one or more networks 120. The communication node 112 is connected to one or more endpoints 122, such as a television 124, a personal computer 128, a stereo 132, telephone 136, or in general any other electronic device as represented by box 140. Associated with the communication node 112 are one or more profiles 144, as will be discussed in detail hereinafter.

Typically, the content/service provider 108 provides content, such a video content, to a user via the data pipeline 116 and the communication node 112. An exemplary embodiment of the present invention expands on this concept and in conjunction with one or more profiles 144 provides enhanced content capabilities through the communication node 112. A content/service provider 108 can, in an exemplary embodiment, comprise a cable company that provides content and services on a subscription and/or pay-per-view basis. The content and services can include scheduled television programming, on demand television programming, Internet connectivity, and voice telephony services. In addition, the content/service provider 108 can provide connectivity to the communication node 112 to international networks, such as the Internet as part of an Internet or digital data connectivity service, and the public switched telephony network (PSTN) as part of a digital telephony or voice over Internet protocol (VoIP) telephony service. Accordingly, communication node 112 connectivity to at least some networks 120 can be through the content service provider 108.

In general, the communication node or set-top box 112 is capable of receiving content, such as video content, as well as providing or enabling services such as access to the Internet, telephony service, and the like. The communication node 112 can also handle control information, including information received from a user that is passed to the network 120 and/or the content/service provider 108. As will be described in greater detail elsewhere herein, the communication node 112 generally incorporates or is associated with hardware running application programming to perform various operations of the system 100. The communication node 112 may also be capable of providing services such that, for example, the user located at one of the attached devices or endpoints 122 utilizes the communication node 112 to assist with the ordering, consumption and/or management of goods or services.

Furthermore, and in accordance with an optional exemplary embodiment, trusted relationships can be established between the content/service provider 108 and one or more trusted entities 104. For example, the content/service provider 108, such as a cable company, can negotiate trusted relationships with various service providing entities. Upon the completion of various checks and assurances from the service providing entities, the various entities could be listed as a trusted entity 104, at which point service requests made via the communication node 112, in conjunction with a profile 144, would be handled in a different manner. In accordance with still other embodiments, a trusted entity 104 can negotiate a trusted relationship with a user and/or a persona associated with a particular communication node 112. A trusted entity 104 can also comprise an Internet service provider or other content service provider, in addition to the content service provider associated with the communication node 112, or can be individual users, groups of users, or entities with whom a persona associated with the communication node 112 exchanges content or other information.

The association of a profile 144 with the communication node 112 allows, for example, a richer communications environment to be provided to a user. This can include the presentation of information to the user, for example in the form of a pop up that provides a suggestion that the user may like to perform some additional action based on an affinity derived at least in part from a profile 144. Moreover, at least some aspects of that additional action can be performed through or in connection with the communication node 112. Profile information 144 can also be used to exchange information with one or more trusted entities 104 for example to exchange information between users or groups of users on the system 100, that are potentially associated with the same or different communication nodes 112, in which the users share a common interest or affinity. Therefore, in accordance with at least some embodiments, profiles 144 used in conjunction with one or more applications on the communications node 112, and potentially used in conjunction with information from a trusted entity 104 and/or the content service provider 108, provide a richer experience for a user of the communication node 112 for interacting with one or more content/service providers 108, trusted entities 104, other entities or users, or in general any entity where a richer experience can be provided based on the information available via the profile 144.

Figure 2:
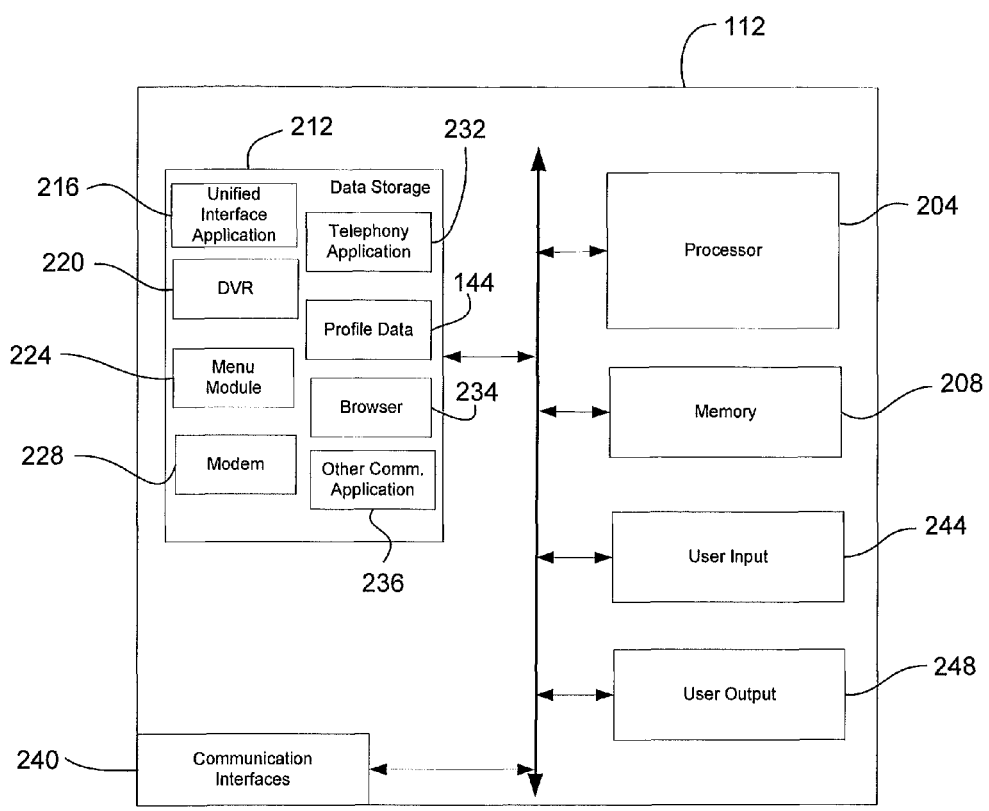
FIG. 2 illustrates components of an exemplary communication node according to embodiments of the invention.

FIG. 2 illustrates in greater detail components of an exemplary communication node 112. In general, a communication node 112 can comprise a general purpose computer or server device that implements, for example, a set-top box. Accordingly, the communication node 112 can include a processor 204. The processor 204 may comprise a general purpose programmable processor or controller for executing application programming or instructions. As a further example, the processor 204 may comprise a specially configured application specific integrated circuit (ASIC) or other integrated circuit, a digital signal processor, a hard wired electronic or logic circuit such as a discrete element circuit, a programmable logic device or gate array, such as a PLD, PLA, FPGA, PAL, special purpose computer, or the like. The processor 204 generally functions to run programming code or instructions implementing various functions of the communication node 112.

A communication node 112 may also include memory 208 for use in connection with the execution of application programming by the processor 204, and for the temporary or long term storage of program instructions and/or data. As examples, the memory 208 may comprise RAM, SDRAM, or other solid state memory. Alternatively or in addition, data storage 212 may be provided. In accordance with embodiments of the present invention, data storage 212 can contain programming code or instructions implementing various of the applications or functions executed or performed by the communication node 112. Like the memory 208, the data storage 212 may comprise a solid state memory device or devices. Alternatively or in addition, the data storage 212 may comprise a hard disk drive or other random access memory.

In accordance with embodiments of the present invention, the data storage 212 can include various applications and data. For example, the data storage 212 can include a unified interface application 216. As described in greater detail elsewhere herein, the unified interface application 216 can operate to present information to a user regarding real time media, status and/or historical information related to real time media, stored media programming, the status and/or history of communications, the status and/or history of Internet sessions, or other current or historical status information related to content accessible through or in association with a data pipeline 116, a content service provider 108 and/or a network 120 interconnected to the communication node 112 by the data pipeline 116. The unified interface application 216 can also operate to determine and provide suggested content and/or actions, for example through the determination of an affinity for particular content or actions in association with information stored as part of profile data 144.

The data storage 212 can also include a digital video recorder (DVR) function or application 220. The DVR 220 can be used to store video information, as conventionally known. For example, the DVR 220 can be used to make a recording of programming or other content for personal time shifting purposes of a user. A menu module 224 can be included to provide an interface, such as a graphical user interface, that can be displayed, for example in association with the operation of the unified interface application 216, to allow a user of the communication node 112 to access programming and control aspects of the operation of the communication node 112. For example, the menu module 224 can present interactive program guides, and can provide an interface for the operation of the DVR 220.

A modem function or application 228 can be provided to facilitate connectivity between, for example, networks 120 accessed through the communication pipeline 116 and the communication node 112 and/or interconnected devices 122. For instance, a modem function 228 can comprise a cable modem that facilitates interconnection of an endpoint 122 such as a personal computer 128, for example via a local Ethernet network, to the communication node 112, and in turn to the content service provider 108, networks 120, or other networks or entities, via the data pipeline 116.

A telephony application 232 can similarly be provided to facilitate interconnection of a telephone, soft phone, video phone or other telephony endpoint 136 to a network or entity via the data pipeline 116. In addition, an Internet browser application 234 can be provided. Other communication applications and/or functions 236 can also be provided, to enable the communication node 112 to be interconnected to and/or operate in association with the different communication endpoints 124 to 140, or other nodes. Other communication applications 236 can also include support for communications by the communication node 112 over links and/or networks in addition to those accessed using the data pipeline 116. For example, a function to enable communications over the public switched telephony network can be provided.

Profile data 144 can also be stored in data storage 212 included in or associated with the set-top box 112. As described in greater detail elsewhere herein, profile data 144 can include information defining or associated with the different personas of users or user groups, to facilitate interaction of such users or user groups with content or other users or user groups via the communication node 112.

A communication node 112 can also include one or more communication interfaces 240. For example, a communication interface 240 interconnecting the communication node 112 to the data pipeline 116 can be provided. As can be appreciated by one of skill in the art after consideration of the present disclosure, a communication interface 240 interconnecting the communication node 112 to the data pipeline 116 can support transfers of data comprising, for example, television programming, voice telephony, Internet browsing sessions, and control signals regarding transfers of such content and/or the operation and interaction of the communication node 112 with respect to the content service provider 108 and/or other entities. As further examples, a communication interface 240 can include an interface that interconnects the communication node 112 to one or more communication endpoints 122 that are interconnected to the content service provider 108 or other entities via the connection to the data pipeline 116 provided by or in association with the communication node 112. Accordingly, a communication interface 240 can include a plain old telephone system (POTS) interface for interconnecting a telephone to the communication node 112. As another example, a communication interface 240 can include a network interface card (NIC) or other network interface to facilitate interconnection of a personal computer 128 or some other network node, device or endpoint 122 to the communication node 112 via a local area network connection, such as a wired Ethernet connection. Examples of other network nodes or endpoints 122 interconnected to the communication node 112 through a communication interface 140 therefore include a wireless access point, for example to provide a Wi-Fi network, a wired Ethernet hub, and the like. Therefore, an endpoint 122 can be intermounted to the communication node 112 through an intermediate node and/or network. As yet another example, a communication interface 240 can include an interface that provides broadcast media to a digital or analog television 124 set via a coaxial cable interconnection. As yet another example, a communication interface 240 can include an infrared interface, for example for receiving control inputs from a user operating a remote control device. Other communication interfaces 240 can be provided, depending on the requirements of the communication endpoint 124 to 140 or other device to be interconnected to the communication node 112.

A communication node 112 can also include user input 244 and user output 248 devices. Examples of a user input 244 include a keyboard, a keypad, remote control, position encoder operated in association with a display, a touch screen, switch, microphone, or any other device capable of receiving input signals from a user. Examples of a user output device include a display, speaker, or indicator lamp.

As can be appreciated by one of skill in the art after consideration of the present disclosure, various functions and/or components of a communication node 112 can be integral to the communication node 112, or can be provided by separate devices. For instance, a communication node 112 comprising a set-top box can operate in association with an endpoint 122 comprising a television 124, such that the television 124 is operated as a user output device 248. More particularly, the television 124 in this example can be operated to display a user interface, generated by operation of the unified interface application 216 that is presented to a user. Continuing the example of a communication node 112 comprising a set-top box, a user input 244 can comprise a remote control device that provides a plurality of keys, implemented as hardware or, for example as a touch screen interface, that can accept control inputs from a user that are passed to the communication node 112, for example via a wireless infrared link between the remote control device comprising the input 244 and a communication interface 240 of the communication node 112. In accordance with still other embodiments, a user input 244 and user output 248 can be physically separate from the communication node 112, and can be combined in a single device. For example, an endpoint 122 or a further communication node comprising a tablet computer 128 or other device 140 can provide a touch screen interface that presents information generated by the unified interface application 216 to a user, and that accepts input from that user. Moreover, the tablet computer 128 can communicate with the communication node 112 via a wireless link, for example a Wi-Fi or Bluetooth link, established in association with a communication interface 240 of the communication node 112. Accordingly, a tablet computer 128 or other endpoint 122 can perform at least some functions of a communication node 112, including providing a user input 244 and/or a user output 248. Other examples of components or functions that can be provided separately from a communication node 112 include a cable modem, for example for interconnecting the data pipeline 116 to a local area network to which endpoints such as a personal computer 128 are connected.

Figure 3:
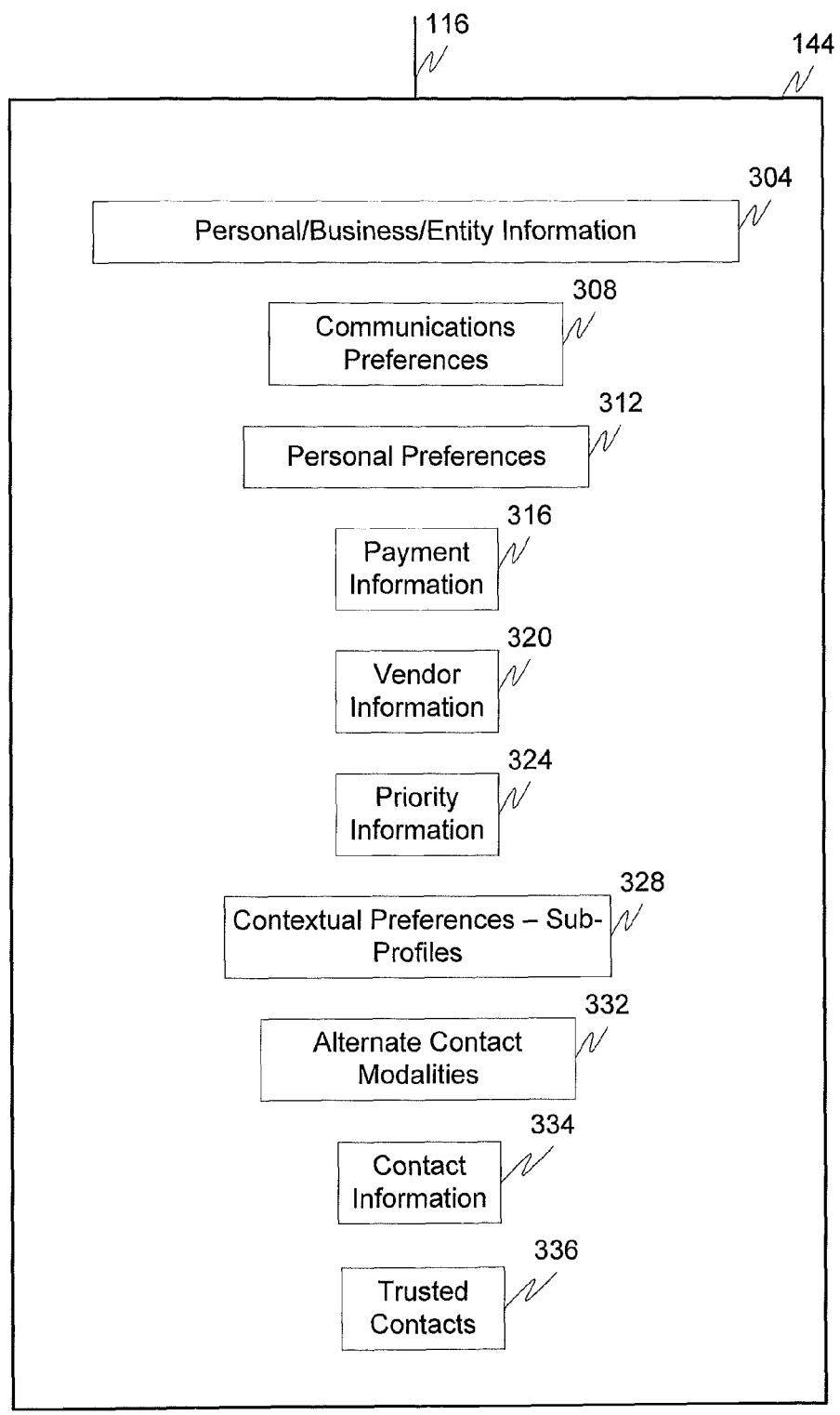
FIG. 3 illustrates an exemplary profile according to embodiments of the invention.

FIG. 3 depicts an exemplary profile according to embodiments of the present invention. The exemplary profile 144 comprises one or more of business, personal, and entity information 304, communications preferences 308, personal preferences 312, payment information 316, vendor information 320, priority information 324, contextual preferences and sub-profiles 328, alternate contact modalities 332, contact information 334, one or more trusted contacts 336, and/or other information that defines or is related to a persona.

One or more of the personal, business and entity information 304 can include any information that a user would like to store. Examples of personal information include name, address, credit card information, banking information, movie preferences, entertainment preferences, communications preferences, restaurant preferences, vendor preferences, billing preferences, and the like. Examples of business information include preferred vendors, banking information, communications preferences, ordering or inventory information, employee information, payment information, accounting information, business management information, or in general any information related to a business. Entity information can also include information about items such as groups of individuals, groups of businesses, or in general any entity that may not be personal or business in nature. Interfaces can be provided that provide access to the information stored within the profile 144, and this information can be edited, updated or deleted as appropriate. The editing, updating or deleting of this information can be performed via an interface on the communication node 112, or via any interface connected to the communication node 112. This access to the information within the profile 144 can be password protected, and the information can be transferred via or in accordance with well known encryption techniques and standards.

The communications preferences 308 provide to the user the ability to store various types of communications preferences or modalities that can determine not only the type of communication to use to access the user, e.g., video, chat, email, IM, telephone, or the like, but that can also be used in conjunction with presence information and/or communication routing.

The personal preferences 312 are a set of rules related to personal preferences associated with a particular user or user persona. These personal preferences 312 can relate to any functionality of the set-top box, display characteristics of the communication node 112, operation of the communication node 112, or the like, and can be related to any one or more of menu options, viewing preferences, communications preferences, contact preferences, set-top box management, or the like. In addition, personal preferences 312 can include general categories of likes and dislikes, or other information that can be used to determine an affinity of a user or persona associated with the personal preference 312 information with regard to various content, activities, scheduled events, or other information that can be accessed in association with the communication node 112.

Payment information 316 stores various information that can be used for payment of goods and/or services ordered through or in conjunction with the communication node 112. This payment information 316 can have a higher security level than other types of information within the profile 144, such that, for example, a password is required before the purchase for goods and services can be made. Additionally, the payment information 316 could be limited to use by the content/service provider 108.

Vendor information 320 can include such information as preferred vendors, vendors who should not be used, historical purchase information, account information, reference information associated with a particular vendor, or in general any information associated with a vendor. When new vendors are utilized, new information can be added to the vendor information 320 and stored as part of the profile 144. In addition, the vendor information 320 can be dynamic such that as, for example, a user accesses a particular vendors website, account information can be populated into the vendor information 320 such as order placed, remaining balance, special offerings, or in general any information associated with that particular vendor.

Priority information 324 includes any information, such as rules, that can be used to assist with prioritizing certain activities, applications, or in general, any functionality associated with the communication node 112. This priority information 324 could also be used in conjunction with the personal preference information 312 to assist with determining prioritization of certain activities.

The contextual preferences and sub-profiles 328 establish preferences based on context that could also be categorized as sub-profiles depending upon, for example, a particular application being run on the communication node 112. As with the other types of information, the contextual preferences 328 can be used by the unified interface application 216 to provide dynamic application behavior.

The alternate contact modalities 332 outline various contact modalities for a particular user. These alternate contact modalities 332 can be used with the communication preference information 308, personal preference information 312 and/or priority information 324 to assist with completion of an incoming communication to an endpoint. For example, based on information in the alternate contact modalities, one or more of a binding module and an SIP functionality module can be utilized to complete an incoming communication to an endpoint where the user is located.

Contact information 334 may comprise the names and addresses of individuals or companies associated with the persona represented by a profile 144. The addresses can be addresses for one or more communication modalities, and can include but are not limited to telephone numbers, email addresses, IM addresses, and IP addresses of endpoints 122. The contact information 334 can include information obtained from a user's electronic address book. Trusted contacts 336 include information regarding one or more individuals or other entities included in the contact information 334 that are trusted. For example, a contact can be considered trusted if it is approved by the content/service provider 108. Additionally, an entity can be trusted if, for example, the user has had previous interactions with the entity and has identified them it as being trusted. The trusted contacts 336 need not be limited to businesses that sell goods and/or services, but can also include entities such as schools, other individuals, or in general any one or any entity that is identified as being trusted. For example, in a social networking environment, parents can establish rules that can identify certain chat groups or other users that are trusted.

Figure 4:
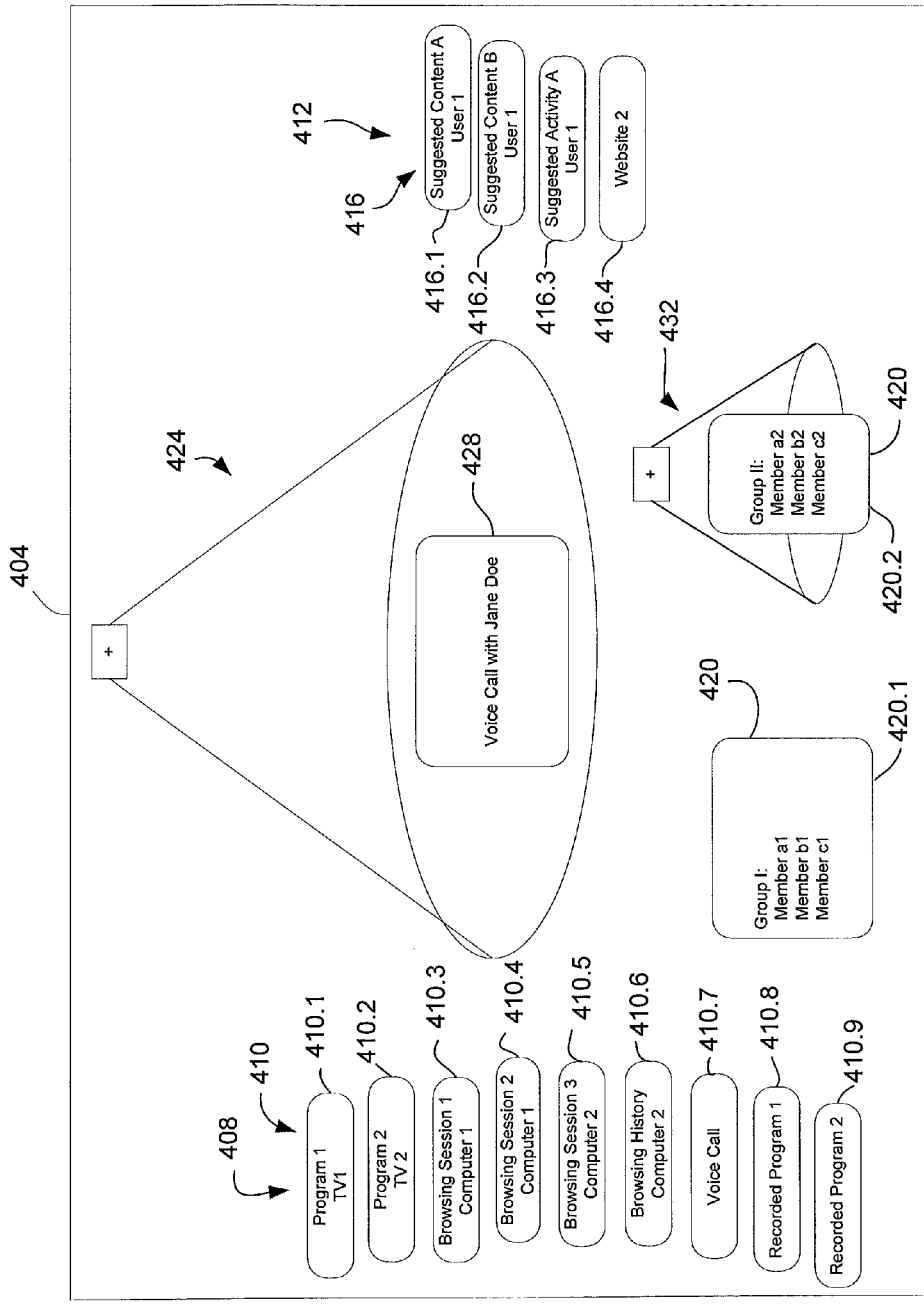
FIG. 4 is a depiction of an exemplary user interface according to embodiments of the invention.

FIG. 4 is a depiction of an exemplary user interface 404 in accordance with embodiments of the present invention. More particularly, the user interface 404 can be generated by or in connection with the operation of the unified interface application 216. The user interface 404 can be provided by a user output 248 integral to the communication node 112, or by an interconnected endpoint or other device 122, such as a television 124, or tablet computer or other computing device 128 interconnected to the communication node 112. The user interface 404 includes different items of information. Moreover, the user interface 404 is interactive, and can be manipulated in response to input by a user, for example, by receiving input through the user input device 244 comprising a position encoder or, where the user interface 404 is provided as part of a touch screen display, for example as part of a tablet computer 128, various items of information can be moved, accessed, selected, or otherwise manipulated directly.

In accordance with at least some embodiments of the present invention, the user interface 404 can include a rolodex or menu comprising listings of selectable items of information. More particularly, a first rolodex or listing 408 can include a number of status tiles, small windows or icons 410 that present information regarding content currently being accessed or that have been accessed in the past in connection with the operation of the communication node 112 and the data pipeline or link 116. This information can include a title or brief description of the content and an associated endpoint 122. In accordance with exemplary embodiments of the present invention, the status tiles 410 provided as part of the first rolodex or collection of information 408 can comprise programs being viewed. For example, a first program may be playing on a first TV, as presented by a first tile 410.1, and a second program may be playing on a second TV, as represented by a second tile 410.2. Other items of information include information regarding current browsing sessions 410.3, 410.4, 410.5. Moreover, different status tiles 410 can be provided with respect to different browser windows or tabs associated with a particular user or user device or computer 128. As another example, browser history can be accessed in separate tiles 410.6. Status tiles 410 can also be provided to present information regarding in-progress digital voice sessions (i.e., voice telephony calls) or a historical record of such calls 410.7. As yet another example, status tiles 410 can be provided that contain information regarding recorded programs 410.8, 410.9. Recorded programs can be the result of the operation of the DVR function 220 of the communication node 112. In general, the status tiles 410 contain current or historical status tiles and therefore provide information relating to content that is being viewed, has been viewed, or is available for viewing or otherwise accessing. In addition, the individual status tiles 410 can contain information in addition to information identifying the content generally. For example, information concerning the age appropriateness, subject matter, associated user or persona, endpoint 122, or other information can be included. Moreover, at least some of this information can be displayed in a default state, while other items of information can be accessed by selecting or otherwise drilling down into the associated information, for example by clicking on or otherwise selecting an individual tile in the first rolodex 408. In accordance with still other embodiments of the present invention, the content to which a tile in the first rolodex 408 is related can be represented by presenting a frame, screen scrape, series of frames, or other representation of the actual content in the associated tile. Accordingly, historical and/or current status information regarding content that has or is being accessed by a communication node 112, or that is available to the communication node 112, regarding a plurality of items of content obtained in connection with a plurality of different services made available over a simple data pipeline 116 can be displayed simultaneously.

By selecting a status tile 410, a user can access additional information about the represented content. For example, the user can access details about the television programming, alternate broadcast times, the history of browsing sessions, the history of incoming and outgoing voice telephony calls, details about recorded programs, etc. Moreover, these details can include information used to generate affinity scores through the application of user profiles 144. Accordingly, the user interface 404 provides a means by which a user can select, interact with, or manipulate content.

A second rolodex or listing of information 412 can also be provided. In accordance with exemplary embodiments of the present invention, the second rolodex 412 can include pop-ups in the form of suggestion tiles or small windows 416 that are displayed in response to activity regarding content and/or personas associated with the communication node 112. The suggestion tiles 416 presented in the second rolodex 412 can comprise dynamic pop-ups to alert a user to other activity that the viewing user may wish to participate in, or take action in regard to. For example, based on information in the profile 144 for the user's then active persona, an affinity of that persona with respect to items of content that are active or available in the first rolodex 408 can be generated. As examples, different items of suggested content 416.1 and 416.2 can be presented. As a particular example, if a first user is watching a television program, for instance as indicated in a first status tile 410.1, a suggestion tile 416.1 can be generated by the unified interface application 216 as a pop-up to indicate suggested content and the predicted affinity of the user for that content. The association of the content suggested by the suggestion tile 416.1 can be identified by applying information maintained in the profile 144 of the currently selected persona. In addition, the information in the profile 144 can be compared to information regarding the television programming represented in the status tile 410.1. Such information can include the subject matter of the programming, theme, or other information that can broaden a user's understanding of the programming, provide background information and context, or other subject matter related information. As another example, the suggestion tile 416.1 can provide related information. For instance, information about ratings associated with the programming, or suggestions for other, related programming.

The suggestion tiles 416 can also include suggestions of activities that a user may wish to participate in. For instance, a suggested activity can be presented in a suggestion tile 416.3, based on the affinity predicted for that activity from the content being accessed by a user. A suggested activity could be some activity, such as a broadcast, live event, or the like that is in progress or scheduled to occur, and that is related to the programming, the subject of the programming, or otherwise related to that programming that is presented in a suggested activity tile 416.3. Other examples of suggested activities include subscribing to news feeds or newsletters, making a reservation to attend an event, booking travel and lodging in association with an event or other activities.

Other suggestion tiles 416 can include alerts regarding content represented in a status tile 410 as that content relates to particular users. Accordingly, a suggestion tile 416 can be presented to a first user regarding activity conducted by a second user. As an example, a parent (user 1) may be presented with a pop-up tile 416.4 to alert the parent that a child in a household containing and operating the communication node 112 (user 2) is accessing programming, web pages, or other content that may be age inappropriate. For each of the suggestion tiles, an affinity rating can be displayed. In the example suggestion tiles 416, the affinity rating is numeric. However, other scales can be used, such as a star rating.

The user interface 404 also allows the user to access detailed information regarding the suggestions presented in suggestion tiles 416. For example, by selecting a suggestion tile, a user can access additional detail. Such detail can include additional information about the suggested content, event, or other subject of the suggestion, the basis for the affinity finding, or the like. By selecting a suggestion tile 416, a user can also access the suggested content or take action with respect to a suggested activity. For instance, by selecting a suggestion tile 416.1 that suggests a particular website to a user, the user can view that website. The rendering of the website can replace the user interface display 404, can be presented as a sub-frame or window as part of the display 404, or can be displayed on an affiliated device. For instance, where the user interface 404 is displayed by a tablet computer 128 in communication with a communication node 112, a selection to view a website can replace programming that was previously being viewed on a television 124, or the programming and the website can be presented simultaneously by the television 124. As another example, television programming being viewed can continue to be displayed by the television 124, while the selected webpage can be displayed on a personal computer 128 selected by the user. With respect to activities, selection can result in presenting the user with a fillable form to enable the user to take further action with respect to the activity, for example registering to participate in the activity.

Status tiles 410 and/or suggestion tiles 416 can be presented as groups of related items. For example, items of content represented by tiles 410 and/or 416 can be presented in groups where the group members are related to one another by topic, series, program, or predefined group.

In accordance with still other embodiments of the present invention, contact groups 420 can be generated. In particular, contact groups 420 can be generated through an analysis of user contacts maintained as contact information 334 in a profile 144. Various criteria can be applied to identify appropriate members for the group 420. Such criteria can include level of trust, social media association, geographical location, and likes or dislikes of the contacts, or other information that can be used to identify the affinities of contacts with respect to content passed through or handled by the communication node 112. Based on common attributes or affinities, suggested groups 420 can be created through operation of the unified communication interface application 216, and presented to the user by the user interface 404.

In addition to suggested groups, the unified interface application 216 can also store and/or access groups defined by a user, for example that are stored as part of a user profile 144. Some or all of a user's predefined groups 420 can also be displayed by the user interface 404.

In accordance with embodiments of the present invention, the user interface 404 can feature a spotlight 424. The spotlight 424 can be used to initiate actions, and to provide a representation of current activities. More particularly, a spotlight 424 can be used to initiate real time communications, such as voice telephony communications, and to provide a representation of ongoing communications. Accordingly, in the example figure, a status tile or icon 428 is presented in the spotlight 424, indicating that the user is engaged in a real time communication session with an individual. For example, the user can be engaged in a real time conversation using an endpoint comprising a telephone 136 that is interconnected to the communication node 112. The user can add conference participants by, for example, dragging contacts from a group 420, or from a global list of contacts, and dropping it into the spotlight 424. In accordance with still other embodiments, other actions can be performed by dragging items into or out of the spotlight 424.

In addition to the spotlight 424, embodiments of the invention provide a warm light 432. The warm light 432 is created by operation of the unified interface application 216 and facilitates and suggests actions that a user may wish to take with respect to contacts. In accordance with embodiments of the invention, the creation of a warm light 432 can be triggered by any interaction involving the user or a member of the contacts group 420 placed in the warm light. Moreover, multiple warm lights 432 can be presented simultaneously by the user interface 404. As an example of the creation and use of a warm light 432, an audio cast or other content may have been distributed to members of a group 420. Whether that group 420 is created automatically through operation of the unified interface application 216, manually by the user, or a combination of automatic and manual means, the unified interface application 216 can place the group 420.2 in the warm light 432. This action provides an indication to the user that some event (in this example the distribution of an audio cast) has occurred with respect to the members of the group, and suggests that the user may wish to take additional action with respect to some or all of the group members as a result. Moreover, since in this example the second group 420.2 has been placed in a warm light 432, but the first group 420.1 has not, a visual indication is provided that suggests that the user is more likely to want to take some action with respect to the second group 420.2 than the first group 420.1. The user can then select the group 420.2 that has been placed in the warm light 432 by operation of the unified interface application 216 if additional action is desired. The selection of the group 420.2 can present additional options from which the user may select. Such additional options can include participating in a conference call with the group, posting information to the group members, accessing information posted to the group, etc. Moreover, the execution of the action can be triggered by moving the group to the spotlight 424.

Figure 5:
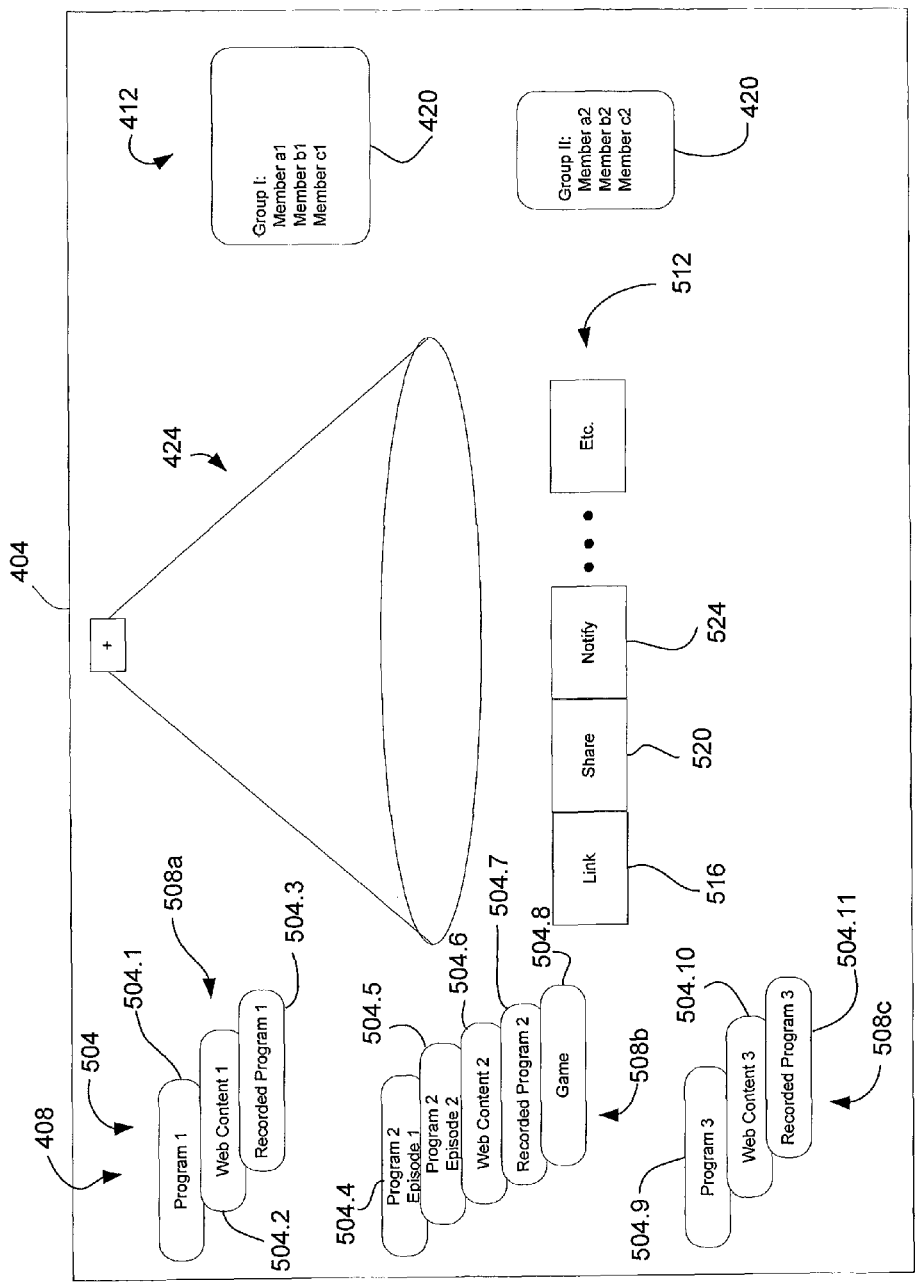
FIG. 5 is a depiction of another exemplary user interface according to embodiments of the invention.

In accordance with embodiments of the invention, the user interface 404 can provide or display alternate configurations. For example, as illustrated in FIG. 5, a first rolodex or listing 408 can comprise content tiles 504 that each represent individual items of content. Moreover, the content tiles 504 can be arranged in groups 508. For example, a first group 508*a* may include items of content that have a topic in common. Moreover, the items of content can be of the same or different content types. For instance, a first item of content 504.1 can comprise a television program, a second item of content 504.2 can comprise content available through the web, and a third item of content 504.3 can comprise a recorded program.

As a further example, a second grouping of content 508b can include items of content from or associated with a television series, different items of content related to a movie, episodes of a series or mini-series, a game themed according to the series, or programming, commentary, or other content related to a series. For instance, a first item of content 504.4 can comprise a first episode of a serialized program, and a second item of content 504.5 can comprise the second episode of that series. A third item of content 504.6 in the series group 508b can comprise web content, for example in the form of a link to a webpage. A third item of content 504.7 can comprise a recorded program, for example from the series, or a program commenting on or otherwise related to the series. A fourth item of content 504.8 can comprise an in-progress game or a recorded portion of a game played by the user or a contact.

Another example of a grouping of content is an instructional group 508c. The instructional group 508c can include items of content having a common educational purpose or theme. For example, a broadcast program can comprise a first item of content 504.9 in the third group 508c. The third group 508c can also include a link to a webpage 504.10, or recorded programming 504.11.

A second rolodex or listing of information 412 in the example of FIG. 5 can include users or contacts. Moreover, the users or contacts can be arranged in groups 420. The users or contacts included in the groups 420 can be selected based on attributes of the members, for example through shared affinity or association with social media groups, level of trust, geographical location, likes and dislikes of the included contacts, or other information. Moreover, the groups 420 and members of those groups can be presented in response to selections entered by the user, preferences of the user and the group members, recent activity of the user, or other criteria.

The user interface 404 can additionally include a number of selectable actions 512. The selectable actions 512 can include actions that the user can select with respect to particular items of content 504, groups 420, and/or individual contacts or group members. Particular actions 512 that can be selected include a link action 516, to provide a link to an item of content 504 to a user or user group 420, a share action 520 to share selected content or portions of content 504 with a user or user group 420, or a notify action 524 to provide notification of the availability of an item of content 504 to a user or user group 420. Other examples of actions 512 include actions that enable the user to establish communications with one or more members of a group 420, to manipulate content 504, or other actions.

A spotlight 424 can be included for use in connection with initiating various actions 512 or other activities. For example, a user can choose to share a portion of a program, for example as represented by the program tile 504.1 by selecting the program tile 504.1 and dragging it into the spotlight 424. In accordance with further embodiments, the user can select a portion of the program, for example by selecting a series of frames from the program, a slice or block of time for the program, or some other selection of a portion of the program, and then dragging the selected portion or portions to the spotlight 424. The users or contacts with respect to which the selected content 504 is shared can be selected by moving a group 420 or selected members of a group 420 to the spotlight 424. The mode of sharing 512 can be selected through the selection of the associated action 512.

Figure 6:
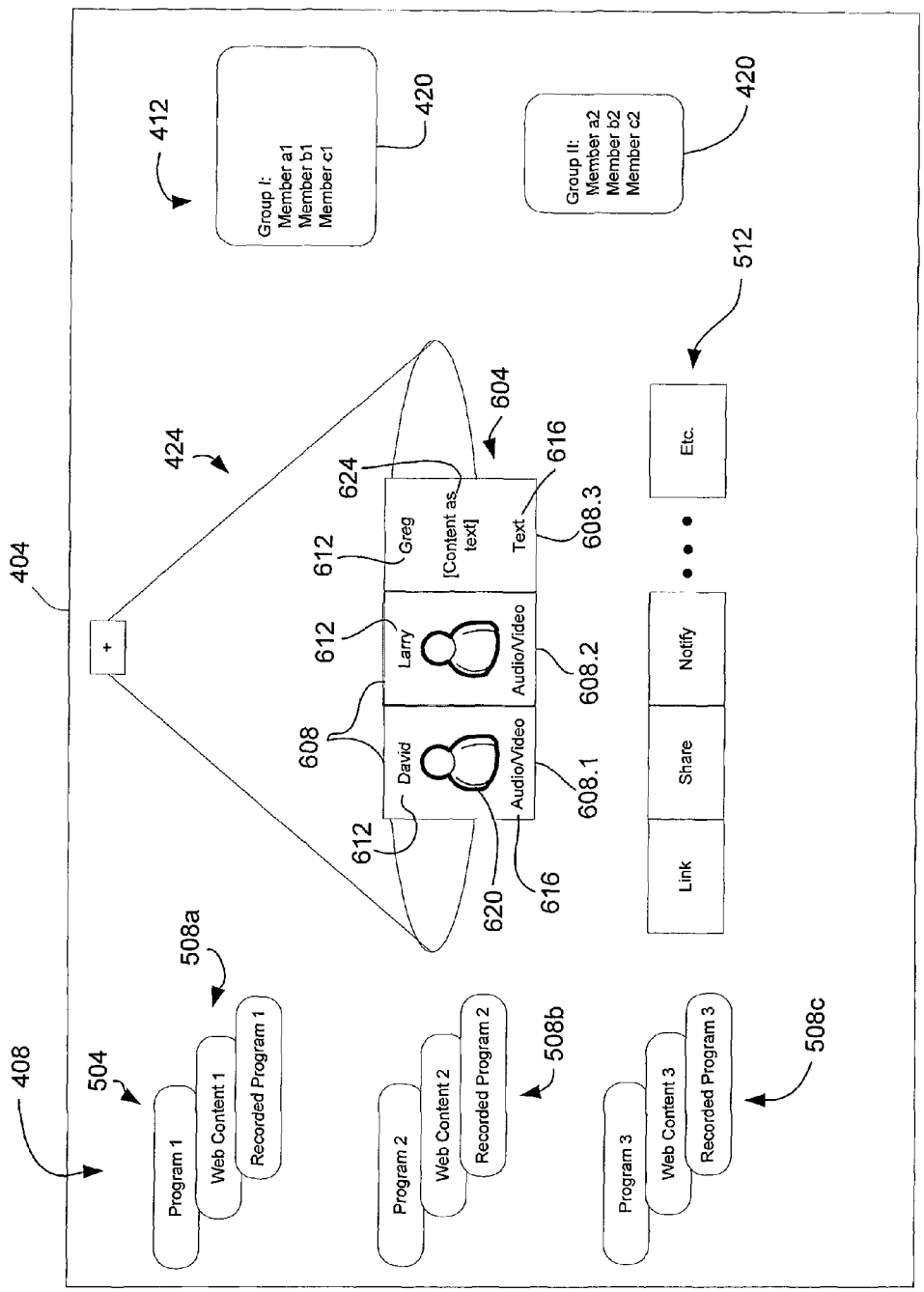
FIG. 6 is a depiction of another exemplary user interface according to embodiments of the invention.

FIG. 6 illustrates a further exemplary configuration of a user interface 404 in accordance with embodiments of the disclosed invention. In this configuration, the first 408 and second 412 rolodexes, and the selectable actions 512, are the same in kind as illustrated in FIG. 5. However, in the example of FIG. 6, the spotlight 424 provides a representation of an in-process, real time multimedia communication through a multimedia dialogue box 604. More particularly, the multimedia dialogue box 604 includes a representation 608 of each participant in the communication. In accordance with further embodiments of the present invention, the communication session can be established and/or managed by providing input to the unified interface application 216 through a user input/output 244, 248 comparing the user interface 404. One of the represented participants can be the local user who interacts directly with the user interface 404. More particularly, the representation 608 of each participant includes the name of the participant 612, and an indication of the mode 616 by which the individual is participating in the communication. The first participant, as represented in the first participant tile 608.1, is further represented by an image 620 of that participant. Moreover, this image 620 can be a video image of that participant. Alternatively, a still image, avatar or icon can be displayed. Similarly, the second participant, as represented in the second participant tile 608.2, can be represented by a video image 620. In this example, the third participant, as represented in the third participant tiles 608.3, is participating via text. Accordingly, speech comprising an audio portion of the communication session can be transformed, for example via an automatic speech recognition (ASR) function to text. This text 624, as provided to the third participant, can be displayed in the tile 608.3. Accordingly, the operation of the automatic speech recognition function can be monitored by the participants (e.g., the first and second participants) who also receive the original audio.

In accordance with further embodiments of the disclosed invention, a user can select content, for example by selecting displayed items of content 504, for delivery or notification to other participants in a communication session, for example as represented by a multimedia dialogue box 604. Accordingly, by dragging a selected item of content to the spotlight 424, a user can share that content in some form with other users participating in a communication session. The mode of sharing can be indicated by selecting a particular action 512. In accordance with further embodiments of the disclosed invention, the shared content can be available to the participants of the communication session immediately. Moreover, the mode in which the shared content is available to individual participants can be varied based on the capabilities of devices or communication endpoints available to the users with whom the content is shared at that time. For instance, where the content being shared is a selected portion of a television program, that content might be displayed to a first user in high definition video and audio, to the second user as standard definition video and audio, and to the third user as a textual representation. In accordance with still other embodiments, the availability of content to selected users and/or the format in which content is rendered can be determined, at least in part, by the permissions or rights held by individual users selected to receive the content.

Figure 7:
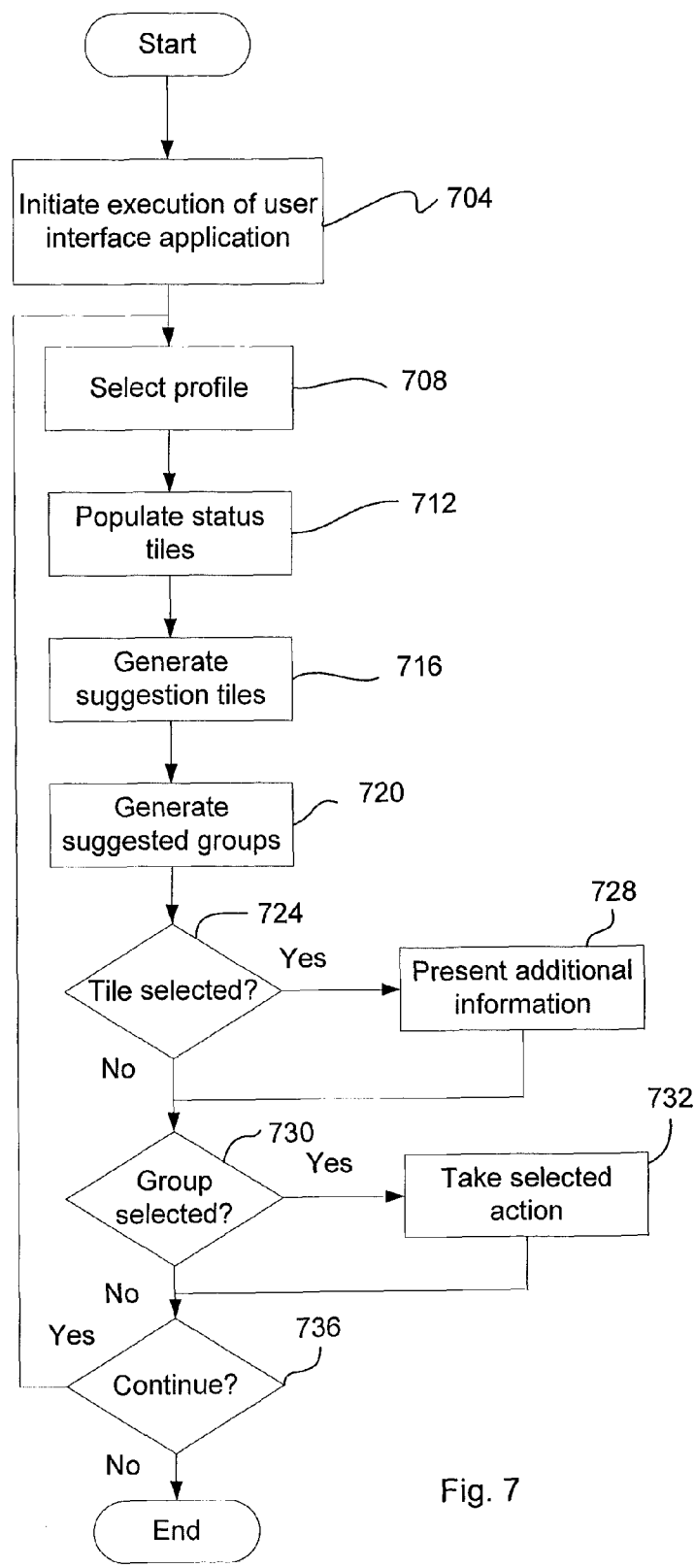
FIG. 7 is a flowchart illustrating aspects of the operation of a system according to embodiments of the invention.

FIG. 7 is a flowchart illustrating aspects of the operation of a system 100 in accordance with embodiments of the invention. Initially, the system 100 is started, for example a user brings up the user interface 404 on a tablet computer 128 interconnected to the communication node 112 by initiating execution of the user interface application 216 (step 704). At step 708, the user selects a profile 144 to apply. In particular, a user may have the option of selecting from any number of profiles 144, to reflect different users of the communication node 112, or different personas of a user. At step 712, the status tiles 410 are populated and displayed by the user interface 404. The status tiles 410 generally provide current and/or historical status information regarding content provided or available to endpoints 122 interconnected to the communication node 112 that are obtained over the communication link 116. At step 716, the user interface application 216 applies the selected profile 144 to the activity that is in part represented by the status tiles 410, to generate suggestion tiles 416. The profile 144 is also applied to generate suggested groups 420 (step 720). The suggested groups can be generated from an analysis of the selected profile 144, content represented in the status tiles 410, or derived from the suggestion tiles 416. The suggested groups can be presented by one or more group tiles 420. In addition or as an alternative to the selection of a profile 144 by a user interacting with a user interface 404 directly, one or more profiles 144 can be selected automatically, and multiple profiles 144 can be applied simultaneously. For example, a profile 144 for each user accessing content can be applied to the respective content in order to generate affinity scores, gauge appropriateness of the content for the user, etc.

At step 724, a determination is made as to whether a tile 410, 416 or group 420 has been selected. If a tile 410, 416 or group 420 has been selected, additional detail and/or menus of actions that can be taken with respect to the content or information represented by the selected tile is presented (step 728). Examples of detailed information that can be presented include details of the programming, such as summary information, identification of creators, actors or other individuals connected to the content, age ratings and the like. Where a status tile 410 is selected that is presenting current status information, the selection of that tile can provide an option to access historical information, for example regarding content accessed by an associated endpoint 122. With respect to a status tile comprising a browser session, an option may be provided to view a historical listing of sites visited during the session. Moreover, an option to view frames or screen scrapes associated with selected content can be made. Actions that can be taken include viewing the content on an endpoint 122 associated with the user, blocking access to the content by selected endpoints 122, adding the content or an attribute of the content to a watch list, or the like.

Actions that can be taken where a suggestion tile 416 is selected includes changing a rating with respect to affinities, viewing criteria used to determine an affinity, accessing suggested content, or the like. Moreover, taking action with respect to a suggestion tile 416 can include dragging the tile 416 into the spotlight 424, for example to initiate viewing suggested content or to initiate a suggested action.

At step 730, a determination is made as to whether a group 420 or group member has been selected. If a group 420 or group member has been selected, a selected action can be initiated with respect to the contact or contacts (step 732). For example, a voice telephony call to a selected contact or group of contact can be initiated. Moreover, the selection of a group 420 or member of a group can include selecting and dragging the group to the spotlight 424. Moreover, where the group 420 has been placed within a warm light 432, by selecting the warm light 432 additional action can be taken. For example, by selecting and dragging the warm light 432 into the spotlight 424, an activity suggested by the warm light 432 with respect to the group can be initiated. For instance, a chat session involving the group can be joined by the user. After taking action with respect to a selected contact or group, or after determining that a selection of a group or contact member has not been made, a determination can be made as to whether the user has elected to discontinue display of the user interface 404 (step 736). If the user has selected to discontinue the display, the process may end. Alternatively, the process can return to step 508, where a user can change an apply profile 144 if desired.

In accordance with embodiments of the present invention, a user interface application 216 can operate with respect to a plurality of profiles 144 simultaneously and regardless of whether a user interface 404 is currently being displayed. Accordingly, a user interface application 216 can operate to collect historical information and to determine suggested affinities even while a user interface 404 is not being displayed.

Embodiments of the disclosed invention have application in connection with user activity and social networks. For example, suggestions presented in one or more suggestion tiles 416 can suggest interactions with other users, either locally (i.e., connected to a common communication node 112 by a connected endpoint 122) or over a wider area (e.g., interconnected to one another via a network 120 and/or content/service provider 108). Moreover, such interactivity can be suggested with respect to groups 420 or individual contacts. As an example, a suggested group 420 can be populated based on a determined affinity for a television program. Based on a record of program episodes viewed by a user, for example stored as part of a user profile 144, a suggestion to interact with a group member (a contact) who is watching a next episode of the programming can be made. This suggestion can be in the form of placing the group 420 within a warm light 432. Moreover, the group 420 in this example can contain a single contact. The user can then initiate communications with the contact, for example by dragging and dropping or sweeping the warm light 432 and the included group 420 into the spotlight 424, or by selecting the contact included in the group and further selecting a communication mode.

Figure 8:
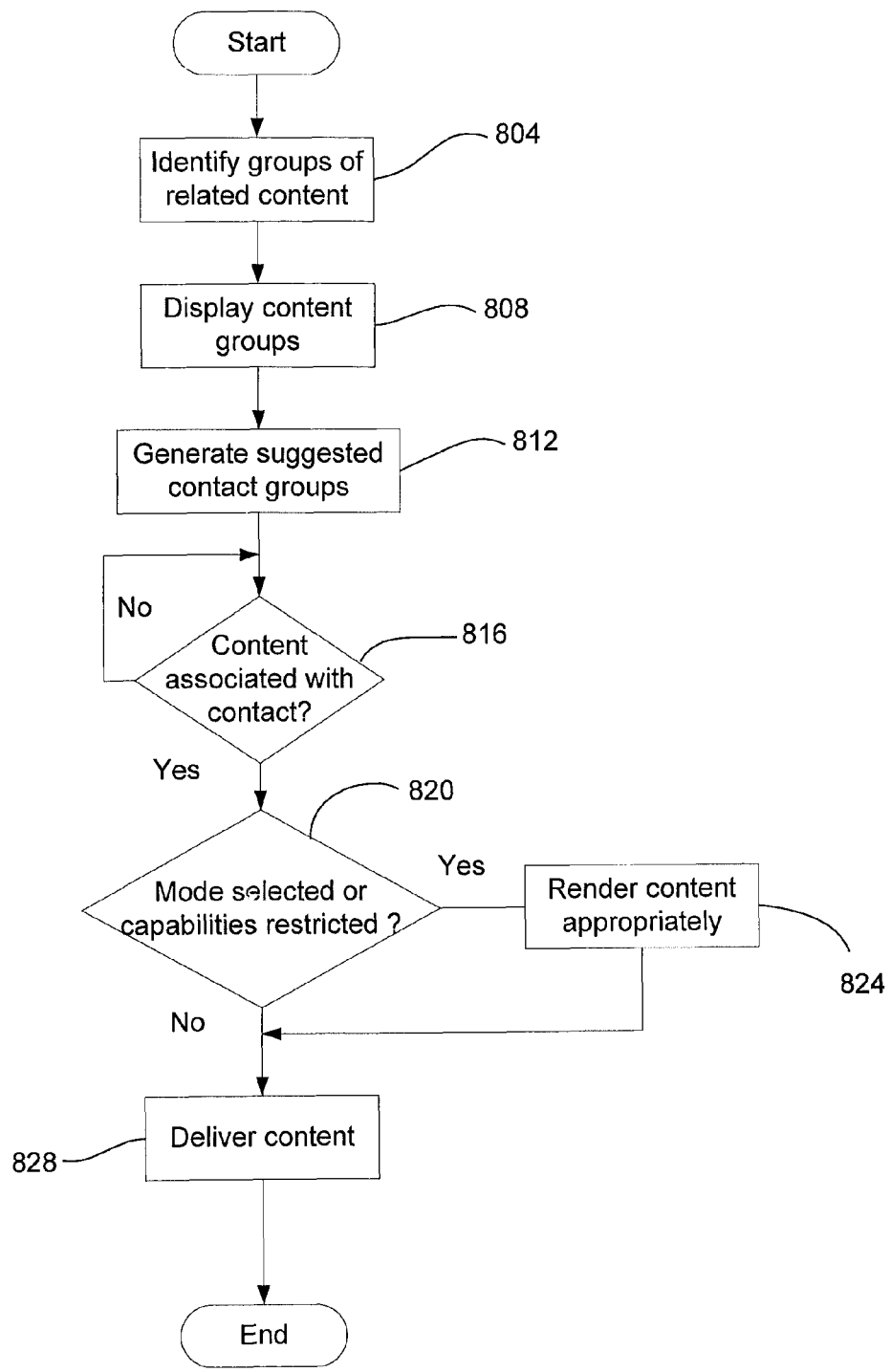
FIG. 8 is a flowchart illustrating additional aspects of the operation of a system according to embodiments of the invention.

FIG. 8 illustrates additional aspects of the operation of a system 100 in accordance with embodiments of the invention. At step 804, after the system 100 has been started, the user interface application 216 operates to identify groupings of related content. The generation of content groups 508 can be performed in response to selections entered in the user profile 144 for a current user interfacing with the user interface 404. Alternatively or in addition, the content groups 508 can be generated in response to input received from the user. At step 808, the user interface application 216 displays content tiles 504 arranged in groups 508. At step 812, the user interface application 216 generates suggested contact groups 420. The suggested groups 420 can identify other users or contacts having one or more common affinities. For example, a first group 420 can include individuals that each have an affinity for a particular television series. As another example, a second group 420 can include individuals that each are members of a department within an organization. In addition, individual users or contacts can be included in more than one group 420.

At step 816, a determination is made as to whether a particular selection of content 504 has been associated with a selected group or subgroup of contacts (i.e., recipients). In particular, items of content can be selected in their entirety, or limited portions of that content can be selected. Similarly, entire groups or one or more members from a group or groups can be selected to receive content. If no selection of content has been associated with selected recipients, the process can idle at step 816 until such a selection has been made. If a selection of content and one or more recipients has been made, a determination is next made as to whether an action indicating a particular mode of sharing 512 has been selected and whether any recipients have restricted capabilities for accessing the content (step 820). If a particular mode of sharing has been selected and/or if a recipient has restricted capabilities, the content can be rendered, transformed, or a representation of the content can be created in compliance with the selected mode or user restriction (step 824). For example, if a link to the content or a summary of the content is to be shared, that link or summary is prepared. After determining the mode of sharing and identifying any restricted capabilities or rights, and providing modified content if appropriate, the content is provided or made available to the recipients (step 828).

As discussed herein, content can be modified from its original form, according to the capabilities and/or permissions of a selected recipient or contact. For example, a contact selected to receive content that is associated with a mobile device may be provided with content that is delivered as standard definition video, even though the original content is in the form of high definition video. As another example, a user or contact selected to receive an item of content comprising video that does not have a suitable device available may be provided with a link to that content or a textual summary of that content, rather than the content itself, as a result of the limitations of the selected contact's device, even though that contact has permission to access the full content. The capabilities of a recipient's device or endpoint (e.g., endpoint 122) can be determined from presence information related to the selected recipient. Moreover, the capabilities of a communication device currently available to a selected recipient can be determined from multimedia dialogue box 508 information, for instance where the selected recipient is participating in a communication with a user of the user interface 404.

Although certain examples described herein have discussed a dedicated communication node 112, alternate configurations are possible. For example, various components shown as being included in a dedicated communication node 112 can be provided by or incorporated into one or more other devices. For example, a communication node 112 can be implemented entirely within a personal computer. As another example, a communication node 112 that provides various supportive communication interfaces 240, but that has limited or no processing capabilities can be provided. In such embodiments, some or all of the processing, for example the execution of the unified interface application 216, can be performed on an associated device, such as a personal computer 128 or other endpoint, or by a server, for example provided by the content service provider 108. In addition, various of the operations described herein can be performed in association with other devices. For example, information regarding the status or presence of contacts can be provided by trusted entities 104 and/or the content/service provider 108. Accordingly, various functions and components can be distributed in various ways.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for sharing content in a set-top box, comprising:
    establishing preferences based on a context that depends upon an application running on a first node;
    receiving, at the application running on the first node, a selection by a first user of a first item of content;
    determining, at the application running on the first node, a first group of users from a plurality of groups of users based on the first item of content selected by the first user;
    receiving, at the application running on the first node, a selection by the first user, of the representation of the first group of users as a recipient of the first item of content;
    in response to the selection of the representation of the first group of users, providing at least the first item of content to the first group of users, wherein the first item of content is a television program with an interactive session;
    determining a first capability of a second node of a second user of the first group of users and a second capability of a third node of a third user of the first group of users, wherein the first capability is an audio and a video capability and wherein the second capability is a text capability;
    providing the television program with an interactive session to the second node with both audio and video; and
    providing the television program with an interactive session to the third node in text.

2. The method of claim 1, wherein the first item of content is represented as one of a plurality of items of content that are related to one another by topical group, series group, or predefined group.

3. The method of claim 1, wherein the plurality of groups is generated through analysis of user contacts.

4. The method of claim 3, wherein at least one of the plurality of groups is generated based on a level of trust.

5. The method of claim 3, wherein at least one of the plurality of groups is generated based on a geographical location.

6. The method of claim 3, wherein at least one of the plurality of groups is generated based on content passed through or handled by the first node.

7. A non-transient computer readable medium having stored thereon instructions that cause a processor to execute a method, the method comprising:
    instructions to establish preferences based on a context that depends upon an application running on a first node, wherein the first node is a set-top box;
    instructions to receive, by the application running on the first node, a selection by a first user of a first item of content;
    instructions to determine, by the application running on the first node, a first group of users from a plurality of groups of users based on the first item of content selected by the first user;
    instructions to receive, by the application running on the first node, a selection by the first user of the representation of the first group of users as a recipient of the first item of content;
    in response to the selection of the representation of the first group of users, instructions to provide at least the first item of content to the first group of users, wherein the first item of content is a television program with an interactive session;

instructions to determine a first capability of a second node of a second user of the first group of users and a second capability of a third node of a third user of the first group of users, wherein the first capability is an audio and a video capability and wherein the second capability is a text capability;

instructions to provide the television program with an interactive session to the second node with both audio and video; and instructions to provide the television program with an interactive session to the third node in text.

8. The non-transient computer readable medium of claim 7, wherein the first item of content is represented as one of a plurality of items of content that are related to one another by topical group, series group, or predefined group.

9. The non-transient computer readable medium of claim 7, wherein the plurality of groups is generated through analysis of user contacts.

10. The non-transient computer readable medium of claim 9, wherein at least one of the plurality of groups is generated based on a level of trust.

* * * * *